United States Patent
Honig

(10) Patent No.: US 9,278,587 B2
(45) Date of Patent: Mar. 8, 2016

(54) TIRE INFLATION SYSTEM AND METHOD OF CONTROL

(71) Applicant: ArvinMeritor Technology, LLC, Troy, MI (US)

(72) Inventor: Jonathan L. Honig, Bloomfield, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 124 days.

(21) Appl. No.: 14/159,709

(22) Filed: Jan. 21, 2014

(65) Prior Publication Data

US 2015/0202931 A1  Jul. 23, 2015

(51) Int. Cl.
*B60C 23/02* (2006.01)
*B60C 23/00* (2006.01)
*B60C 23/10* (2006.01)

(52) U.S. Cl.
CPC ............. *B60C 23/002* (2013.01); *B60C 23/001* (2013.01); *B60C 23/003* (2013.01); *B60C 23/10* (2013.01)

(58) Field of Classification Search
None
See application file for complete search history.

(56) References Cited

U.S. PATENT DOCUMENTS

| | | | |
|---|---|---|---|
| 5,309,969 A * | 5/1994 | Mittal | 152/415 |
| 6,561,017 B1 * | 5/2003 | Claussen et al. | 73/146 |
| 6,604,414 B1 * | 8/2003 | Claussen et al. | 73/146 |
| 6,666,078 B1 * | 12/2003 | Claussen et al. | 73/146 |
| 6,868,719 B1 * | 3/2005 | Claussen et al. | 73/146.2 |
| 6,894,607 B1 * | 5/2005 | Claussen et al. | 340/442 |
| 6,994,136 B2 | 2/2006 | Stanczak | |
| RE41,756 E | 9/2010 | Claussen et al. | |
| 7,931,061 B2 | 4/2011 | Gonska et al. | |
| 2003/0216845 A1 | 11/2003 | Williston | |
| 2004/0173296 A1 * | 9/2004 | White et al. | 152/417 |
| 2005/0102073 A1 * | 5/2005 | Ingram, II | 701/29 |
| 2005/0194080 A1 * | 9/2005 | White et al. | 152/417 |
| 2008/0066533 A1 * | 3/2008 | Beverly | B60C 23/003 73/146 |
| 2010/0024939 A1 * | 2/2010 | Kusunoki | B60C 23/0408 152/416 |
| 2012/0186714 A1 | 7/2012 | Richardson | |
| 2012/0234447 A1 | 9/2012 | Narloch et al. | |
| 2013/0276902 A1 * | 10/2013 | Medley | B60C 23/00 137/12 |
| 2013/0282232 A1 | 10/2013 | Medley et al. | |

OTHER PUBLICATIONS

MERITOR an ArvinMeritor brand, Meritor Tire Inflation System (MTIS) by PSI (TM), including Mentor ThermALERT (TM), PB-9999, revised May 2007.

European Patent Office, European Search Report for the corresponding European Patent Application No. EP 14 18 7680 dated Aug. 20, 2015.

* cited by examiner

*Primary Examiner* — Andre Allen
(74) *Attorney, Agent, or Firm* — Brooks Kushman P.C.

(57) ABSTRACT

A tire inflation system and a method of control. Tire inflation pressure may be adjusted based on a target tire pressure that may vary with vehicle load.

20 Claims, 2 Drawing Sheets

TIRE INFLATION SYSTEM AND METHOD OF CONTROL

TECHNICAL FIELD

This patent application relates to a tire inflation system and a method of control.

BACKGROUND

A tire pressure monitoring method is disclosed in U.S. Reissue Pat. No. RE41,756.

SUMMARY

In at least one embodiment, a method of controlling tire inflation pressure for a vehicle is provided. The method may include determining a vehicle load, determining a target tire pressure based on the vehicle load, and adjusting inflation pressure of the tire based on the target tire pressure.

In at least one embodiment, a tire inflation system for a vehicle is provided. The system may include a pressurized gas source, a pressure sensor, and a controller. The pressurized gas source may supply a pressurized gas and may be configured to be fluidly connected to a tire. The pressure sensor may measure an inflation pressure of the tire. The controller may determine a target tire pressure based on data indicative of a vehicle load and may control the inflation pressure of the tire. The pressurized gas may be provided to the tire when the target tire pressure is less than the inflation pressure of the tire.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
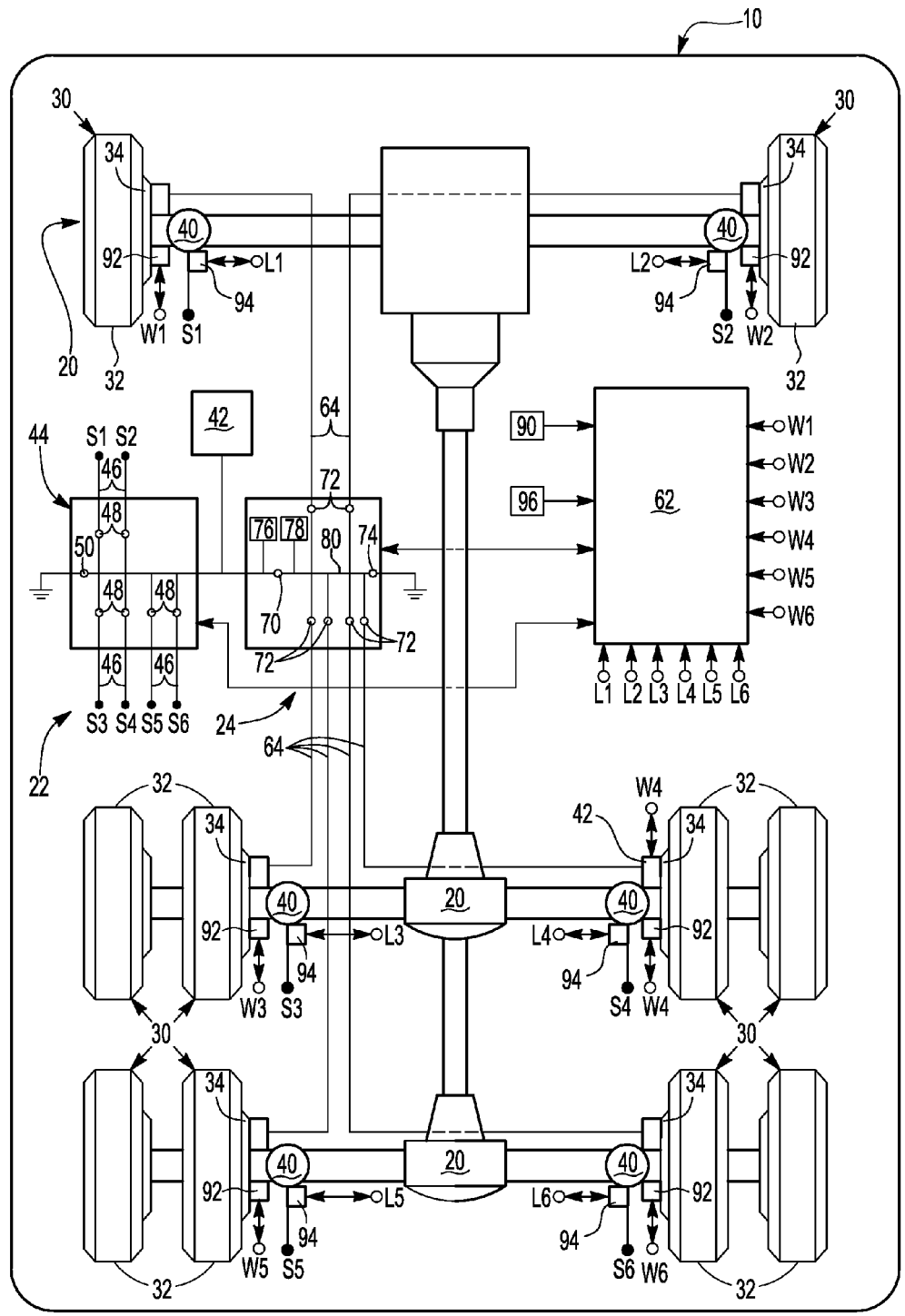
FIG. 1 is a schematic of an exemplary vehicle having a tire inflation system.

Referring to FIG. 1, an exemplary vehicle 10 is shown. The vehicle 10 may be of any suitable type, such as a motor vehicle like a truck, bus, farm equipment, military transport or weaponry vehicle, or cargo loading equipment for land, air, marine vessels, or a trailer that may be provided with a motor vehicle. The vehicle 10 may include a set of axle assemblies 20, an axle suspension system 22, and a tire inflation system 24.

The plurality of axle assemblies or set of axle assemblies 20 may each support and facilitate rotation of at least one wheel assembly 30. The axle assembly 20 may be at least partially disposed under a frame or chassis of the vehicle 10. An axle assembly 20 or member of the set of axle assemblies may or may not be configured as a drive axle that provides torque to at least one associated wheel assembly. In addition, an axle assembly 20 may or may not be configured to steer the vehicle 10. Moreover, an axle assembly 20 may include a steering knuckle assembly in a non-drive axle configuration.

Each wheel assembly 30 may include at least one inflatable tire 32 that may be mounted on an associated wheel 34. Each tire 32 may have a valve that may facilitate inflation and/or deflation of the tire 32. In at least one embodiment, a valve may be a damped valve that may be fluidly connected to the tire 32 and that may open at a faster rate than it closes to facilitate inflation and/or deflation of and associated tire 32 as described in U.S. patent application Ser. No. 14/080,941, which is hereby incorporated by reference in its entirety.

The axle suspension system 22 may interconnect the axle assembly 20 to the chassis. In addition, the axle suspension system 22 and may dampen vibrations, provide a desired level of ride quality, and control trailer ride height or the distance between the chassis and the road or support surface upon which the tires 32 may be disposed. The axle suspension system 22 may be configured as an air suspension system or an air ride suspension system that may employ one or more shock absorbers and one or more air springs 40. The shock absorber may be provided to dampen shock impulses and dissipate kinetic energy.

An air spring 40 may be disposed above a wheel axle and under the chassis to support the chassis of the vehicle 10. The air spring 40 may receive a pressurized gas and may be configured to absorb shocks and vibrations to improve ride quality. In FIG. 1, an air spring 40 is disposed proximate a left wheel axle and a right wheel axle of each axle assembly 20, although it is contemplated that a different number of air springs 40 or different air spring configuration may be provided.

The pressurized gas source 42 may be configured to supply and/or store a volume of a pressurized gas or pressurized gas mixture, such as air and/or nitrogen. For example, the pressurized gas source 42 may include a tank and/or a pump like a compressor that may be driven by a vehicle engine or vehicle power source. The pressurized gas source 42 may be disposed on the vehicle 10 and may be configured to provide a pressurized gas or pressurized gas mixture at a pressure that is greater than or equal to a target inflation pressure of an air spring 40 and/or a target tire pressure or a target inflation pressure of a tire 32. For clarity, the term "pressurized gas" may refer to a pressurized gas or a pressurized gas mixture.

A suspension gas supply subsystem 44 may fluidly connect the pressurized gas source 42 to one or more air springs 40. The suspension gas supply subsystem 44 may include one or more conduits 46, such as a hose, tubing, pipe, or combinations thereof, which may provide pressurized gas to at least one air spring 40 via a corresponding control valve 48 that may enable or disable the flow of pressurized gas to or from at least one air spring 40. For clarity, the conduit connections to each air spring 40 are represented by connection nodes S1-S6 in FIG. 1. The suspension gas supply subsystem 44 may also have a vent valve 50 that may facilitate venting of pressurized gas from an air spring 40 and an associated conduit 46 to the atmosphere or surrounding environment. The conduit configuration, control valve configuration, and exhaust valve configuration in FIG. 1 is merely exemplary. For instance, a single conduit 46 may be associated with multiple air springs 40 rather than individual air springs 40 as is shown in FIG. 1 or multiple exhaust valves may be provided that are associated with one or more air springs 40 and/or conduits 46.

The tire inflation system 24 may be configured to inflate, deflate, and/or check the pressure of one or more tires 32. More specifically, the tire inflation system 24 may be configured to provide and/or exhaust a pressurized gas or pressurized gas mixture to one or more tires 32. The tire inflation system 24 may include or may be fluidly connected to the pressurized gas source 42 and may include a gas supply subsystem 60 and a control system or controller 62.

The gas supply subsystem 60 may fluidly connect the pressurized gas source 42 to one or more tires 32. The gas supply subsystem 60 may include one or more conduits 64, such as a hose, tubing, pipe, or combinations thereof, which may provide pressurized gas to at least one tire 32. The conduit configuration in FIG. 1 is merely exemplary. For instance, a single conduit 64 may be associated with each tire 32 rather than with multiple tires as is shown in the bottom half of FIG. 1. In at least one embodiment, the gas supply subsystem 60 may include an inlet valve 70, at least one outlet valve 72, an exhaust valve 74, a first pressure sensor 76, and a second pressure sensor 78.

The inlet valve 70 may enable or disable the flow of pressurized gas from an outlet of the pressurized gas source 42 to at least one outlet valve 72. Operation of the inlet valve 70 may be controlled by the controller 62. For instance, the inlet valve 70 may include or may be controlled by an actuator, such as solenoid, that may actuate the inlet valve 70 between an open position and a closed position. In the open position, pressurized gas may flow from the pressurized gas source 42 to a manifold 80. The manifold 80 may distribute pressurized gas to multiple conduits 64 and may be disposed between the inlet valve 70 and one or more outlet valves 72. In the closed position, pressurized gas may be inhibited from flowing from the pressurized gas source 42 to the manifold 80. In at least one embodiment, the inlet valve 70 may be normally closed under predetermined operating conditions, such as when the vehicle 10 is not operational or turned off or when the vehicle engine is not running. As such, the inlet valve 70 may inhibit depressurization of the pressurized gas source 42 in the event of a downstream leak.

The outlet valve 72 may enable or disable the flow of pressurized gas from the manifold 80 to a tire 32. In FIG. 1, six outlet valves 72 are shown, although it is contemplated that a greater or lesser number of outlet valves 72 may be provided. Each outlet valve 72 may be associated with a different tire 32 and a different conduit 64. Moreover, each outlet valve 72 may be actuated independently of the inlet valve 70 and independently of each other. As such, the inflation and pressure assessment of different tires 32 or sets of tires 32 may be independently controlled.

Operation of the outlet valve 72 may be controlled by the controller 62. For instance, the outlet valve 72 may include or may be controlled by an actuator, such as solenoid, that may actuate the outlet valve 72 between an open position and a closed position. In the open position, pressurized gas may flow from the manifold 80 to a tire 32. In the closed position, pressurized gas may be inhibited from flowing from the manifold 80 to at least one tire 32. As such, pressurized gas may not be constantly provided to one or more tires 32, which may facilitate the use of pressure pulses to determine tire pressure as will be discussed in more detail below. In at least one embodiment, the outlet valve 72 may be normally closed under predetermined operating conditions, such as when the vehicle 10 is not operational or turned off or when the vehicle engine is not running.

One or more exhaust valves 74 may facilitate venting of pressurized gas from a tire 32 and an associated conduit 64 to the atmosphere or surrounding environment. In FIG. 1, one exhaust valve 74 is shown that is fluidly connected to the manifold 80, although it is contemplated that a greater number of exhaust valves 74 may be provided, such as by providing exhaust valves 74 that are associated with different tires 32 or different conduits 64. For example, such exhaust valves 74 may be provided between a tire 32 and an outlet valve 72 or between an outlet valve 72 and the manifold 80. In addition, the exhaust valve 74 or exhaust valve functionality may be provided with an outlet valve 72. Thus, the exhaust valve 74 may be part of the outlet valve 72 in one or more embodiments. In the configuration shown in FIG. 1, pressurized gas may pass through an outlet valve 72 before being exhausted to the atmosphere through the exhaust valve 74. The exhaust valve 74 may be actuated independently of the inlet valve 70 and/or an outlet valve 72. Moreover, in a configuration having multiple exhaust valves, the exhaust valves 74 may be actuated independently of each other. As such, the inflation, deflation, and pressure assessment of different tires 32 or sets of tires 32 may be independently controlled.

Operation of the exhaust valve 74 may be controlled by the controller 62. For instance, the exhaust valve 74 may include or may be controlled by an actuator, such as solenoid, that may actuate the exhaust valve 74 between an open position and a closed position. In the open position, pressurized gas may flow from a tire 32 and/or associated conduit 64 to the atmosphere. In the closed position, pressurized gas may be inhibited from venting from a tire 32 or associated conduit 64 to the atmosphere. Moreover, the exhaust valve 74 may be closed when pressurized gas is provided to inflate a tire 32 or a pressurized gas pulse is provided to open a damped valve, if provided. In at least one embodiment, the exhaust valve 74 may be normally closed under predetermined operating conditions, such as when the vehicle 10 is not operational or turned off or when the vehicle engine is not running.

The first pressure sensor 76 may be configured to detect the pressure of the pressurized gas provided by the pressurized gas source 42. The first pressure sensor 76 may be of any suitable type and may be fluidly connected to the pressurized gas source 42. For example, the first pressure sensor 76 may be fluidly connected to the pressurized gas source 42 between the pressurized gas source 42 and the inlet valve 70.

The second pressure sensor 78 may be configured to detect the pressure of the pressurized gas provided to a tire 32. The second pressure sensor 78 may be of any suitable type and may be disposed between the inlet valve 70 and the tire 32 and may be fluidly connected to the manifold 80. As such, the second pressure sensor 78 may be isolated from the pressurized gas source 42 by closing the inlet valve 70. In at least one embodiment, the second pressure sensor 78 may be disposed between the inlet valve 70 and one or more outlet valves 72 so that the second pressure sensor 78 may be used to detect the pressure of pressurized gas supplied to different tires. Alternatively, multiple second pressure sensors 78 may be provided that may detect the pressure supplied to a particular conduit 64 or particular tire 32.

Optionally, a tire pressure sensor that may be disposed inside the tire 32 or inside a chamber of the tire that receives the pressurized gas. Such a tire pressure sensor may provide a signal or data that is indicative of the inflation pressure of the tire to the controller 62. The tire pressure sensor may wirelessly communicate with the controller 62 in one or more embodiments.

One or more electronic control modules or controllers 62 may be provided to monitor and control various components and systems of the vehicle 10. For example, the controller 62 may be electrically connected to or may communicate with components of the axle suspension system 22 and tire inflation system 24. For example, the controller 62 may be configured to control actuation of the control valve 48 and vent valve 50 to control the flow of pressurized gas with respect to an air spring 40. In FIG. 1, communication between the controller 62 and these components is represented by the double arrowed line that extends between the controller 62 and the axle suspension system 22. The controller 62 may also be configured to control actuation of the inlet valve 70, the outlet valve 72, and the exhaust valve 74 to control the flow of pressurized gas with respect to a tire 32. In addition, the controller 62 may be configured to receive data from the first pressure sensor 76 and the second pressure sensor 78 that may be indicative of pressure. In FIG. 1, communication between the controller 62 and these components is represented by the double arrowed line that extends between the controller 62 and the tire inflation system 24.

The controller 62 may also process input signals or data from various input devices or sensors. Input devices that may be provided with the vehicle 10 may include an operator communication device 90, a wheel speed sensor 92, a load sensor 94, and a ride height sensor 96.

The operator communication device 90 may be provided to receive an input from an operator. The operator communication device 90 may be of any suitable type or types, such as a switch, button, sensor, display, touchscreen, keypad, voice command or speech recognition system, or the like. The operator communication device 90 may be used to input data that may not be predetermined or provided by a sensor or other input device, such as may be the case when a vehicle 10 is not equipped with one or more of the sensors discussed herein. In addition, the operator communication device 90 may be used to allow manual entry of vehicle load data and/or a ride mode.

The wheel speed sensor 92 may be provided to detect or provide data indicative of a rotational speed of a wheel assembly 30 or wheel 34. The wheel speed sensor 92 may be of any suitable type and may be configured to detect the rotation speed of a wheel assembly 30 or associated wheel axle. Data from the wheel speed sensor 92 may also be used to determine a distance of travel of the vehicle 10. For instance, distance of travel may be based on tire size (e.g., tire diameter) and the rotational distance or number of revolutions detected by the wheel speed sensor 92. In at least one embodiment, a wheel speed sensor 92 may be associated with each wheel assembly 30 or wheel axle, such as may be provided with an anti-lock brake (ABS) system or traction control system. As such, the wheel speed sensor 92 may detect wheel slip or unexpected rotation of a wheel assembly 30 in a manner known by those skilled in the art. Communication between the controller 62 and each wheel speed sensor 92 is represented by connection nodes W1 through W6 in FIG. 1.

The load sensor 94 may be provided to detect or provide data indicative of vehicle load. The load sensor 94 may be of any suitable type. For example, the load sensor 94 may include one or more physical sensors that may be disposed on the vehicle 10 that may detect the pressure of pressurized gas that is disposed in or supplied to an air spring 40. As such, vehicle load may be based on data indicative of pressure in an air spring 40. Alternatively, the load sensor 94 may be a virtual sensor that may receive vehicle load data that may be wirelessly transmitted to the vehicle 10, such as from a scale that may be equipped with suitable communication equipment. Communication between the controller 62 and each load sensor 94 is represented by connection nodes L1 through L6 in FIG. 1.

One or more ride height sensors 96 may be used in place of or to supplement data from a load sensor 94. A ride height sensor 96 may detect the ride height of the vehicle 10, or positioning of a vehicle component or the vehicle suspension system with respect to the ground or support surface. Data from one or more ride height sensors 96 may be used to determine vehicle load or may be correlated with vehicle load. For instance, vehicle load may be calculated from data from one or more ride height sensors 96 or ride height sensor data may be used to reference corresponding vehicle load data in a lookup table. Such a lookup table or calculation formulas may be based on vehicle development testing or ride height positions that are associated with known vehicle loads. As such, vehicle load may be based on vehicle ride height data that may be measured with a vehicle ride height sensor 96.

Figure 2:
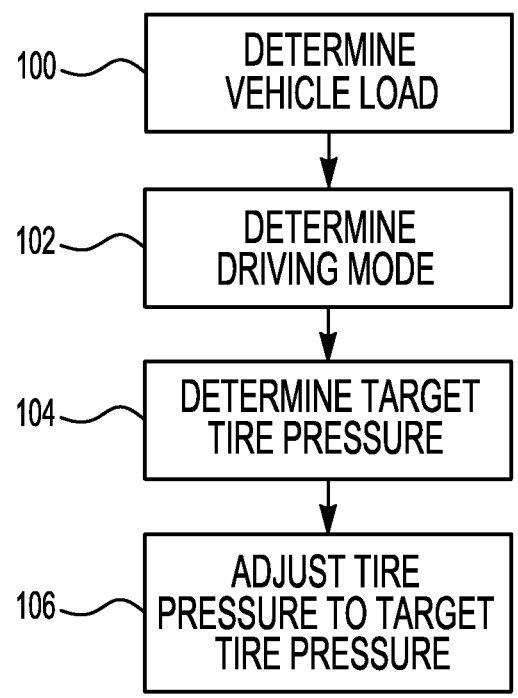
FIG. 2 is a flowchart of an exemplary method of control of the tire inflation system.

Referring to FIG. 2, a flowchart of an exemplary method of control of the tire inflation system is shown. As will be appreciated by one of ordinary skill in the art, the flowchart represents control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multitasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope intended.

In at least one embodiment, the method may be executed by the controller 62 and may be implemented as a closed loop control system. Moreover, the method may be enabled or disabled based on the operating state of the vehicle 10. For example, the method or control logic may be enabled when the vehicle ignition is turned on, when the engine is running, or when the vehicle is in motion in one or more embodiments. In addition, the method may be manually activated.

The method will be primarily described in the context of inflating, deflating, and/or evaluating the pressure of a single tire, but it is to be understood that the method may be applied to evaluate and/or adjust the pressure of multiple tires or sets of tires.

At block 100, the method may determine or check the vehicle load. The vehicle load may be determined based on data from one or more load sensors 94 or ride height sensors 96 as previously discussed. Vehicle load may be determined or checked periodically or in response to various trigger events. For instance, vehicle load may be sampled or checked when a vehicle load sampling interval has elapsed. The vehicle load sampling interval may be expressed in terms of time elapsed and/or distance travelled. For instance, the vehicle load may be checked when a predetermined period of time has elapsed and/or when the vehicle has travelled a predetermined distance. The vehicle load sampling interval may be a constant or variable amount. Alternatively, the vehicle load may be checked based on a driver input, driver command, when the vehicle driving mode changes, when a trailer or similar cargo carrying equipment is coupled to a vehicle, and/or after the vehicle is stationary for a predetermined period of time, which may indicate that cargo has been loaded onto the vehicle or removed from the vehicle.

At block 102, the method may determine a vehicle driving mode and/or desired ride height. Determination or selection of a driving mode or ride mode and/or a ride height may be based on a manual input from a vehicle operator, such as may be provided with the operator communication device 90. For instance, one or more predetermined or preprogrammed driving mode may be selected by an operator. Each vehicle driving mode may be associated with different suspension performance characteristics, such as different spring rates for one or more air springs 40 and/or different ride height settings. Exemplary driving modes may include an on-road vehicle driving mode an off-road vehicle driving mode. An on-road vehicle driving mode may provide a stiffer spring rate than an off-road vehicle driving to accommodate terrain differences. A specific ride height setting or ride height may be associated with a particular driving mode. For instance, a higher ride height may be associated with an off-road vehicle driving mode than is associated with an on-road vehicle driving mode to provide increased ground clearance. In at least one embodiment, multiple ride height settings may be selected by a vehicle operator. Alternatively, a driving mode may be detected automatically based on data from a global positioning system (GPS), which may indicate whether the vehicle is on a road or off a road.

At block 104, a target tire pressure may be determined. The target tire pressure may be based on the vehicle load or the vehicle load and the vehicle driving mode. For instance, the target tire pressure may be referenced directly or by interpolation in a lookup table that may be populated with target tire pressures that are associated with vehicle load values. Multiple lookup tables may be provided that may be associated with different vehicle driving modes. As such, a vehicle driving mode may be used to select a particular lookup table or equation set and a vehicle load value may be used to select or calculate a particular target tire pressure. A target tire pressure for an on-road vehicle driving mode is greater than the target tire pressure for an off-road vehicle driving mode in one or more embodiments.

A target tire pressure may be associated with one or more tires. For instance, a single target tire pressure may be used for each tire on the vehicle. A single target tire pressure may be utilized when a common tire size and tire design is employed for all tires on a vehicle and/or when the vehicle load has or is expected to have a balanced weight distribution.

Alternatively, a single target tire pressure may be used for each tire on an axle assembly. As such, a target tire pressure may be determined for each axle assembly for application to each tire on a particular axle assembly, thereby allowing the target tire pressure to vary from axle assembly to axle assembly to accommodate longitudinal weight distribution differences along the length of the vehicle (e.g., in a direction extending between the front and back of the vehicle). For instance, a target tire pressure may be independently determined for each member of a set of axle assemblies such that the target tire pressure is the same for first tire and the second tire of a selected member of the set of axle assemblies, but each member of the set of axle assemblies may have a different target tire pressure for its associated tires.

In addition, a single target tire pressure may be used for each tire on a particular side of the vehicle. For instance, a first target tire pressure may be established for tires on the left side of the vehicle and a second target tire pressure may be established for tires on the right side of the vehicle to accommodate vehicle load differences in a lateral direction (e.g., in a direction extending between the left side and the right side of the vehicle).

Also, target tire pressures may be determined on a wheel-by-wheel basis such that a target tire pressure is determined for each wheel assembly. As such, a common target tire pressure may be associated with each tire that is disposed on a common wheel, but the target tire pressure may vary from wheel assembly to wheel assembly to accommodate localized vehicle load differences. Such target tire pressures may be based on the vehicle load that is detected or associated with an air spring that may be located closest to a tire or wheel assembly.

At block 106, the tire pressure may be adjusted to the target tire pressure. Adjusting the tire pressure may include multiple steps, such as determining or checking the current tire pressure, comparing the current tire pressure to the target tire pressure, and then, if necessary, inflating or deflating one or more tires to attain sufficient proximity to the target tire pressure.

Tire pressure may be checked or sampled in various ways depending on the configuration of the tire inflation system 24. For example, tire pressure may be directly detected or measured with a tire pressure sensor that may be disposed inside the tire or inside a tire chamber that may receive pressurized gas. Such a tire pressure sensor may wirelessly transmit tire pressure data to the controller 62. Tire pressure may be also be checked by opening a tire valve with a pulse of pressurized gas and then measuring the pressure upstream or in a supply conduit or with a tire pressure sensor that is disposed in the tire. For example, tire pressure may be detected or measured by actuating or opening a tire valve with a pressurized gas pulse and detecting pressure of a feedback pulse with the second pressure sensor 78.

An example of a sequence of steps for providing a pressure pulse is as follows. First, the inlet valve 70 and the outlet valve 72 may be opened to allow pressurized gas to flow from the pressurized gas source 42 to a tire 32. The exhaust valve 74 may be closed so that the pressurized gas is not exhausted to the atmosphere. The inlet valve 70 and the outlet valve 72 may open at approximately the same time. Alternatively, the outlet valve 72 may open before the inlet valve 70 to inhibit potential damage to the outlet valve 72 or other hardware. The inlet valve 70 and the outlet valve 72 may both remain open for a pressurized gas pulse duration time which may be a fixed or variable amount. Next, the inlet valve 70 may be closed when the current pressurized gas pulse duration time has elapsed to terminate the flow of pressurized gas from the pressurized gas source 42 to the tire 32 ends the pressurized gas pulse. Then, a delay may be executed to allow the pressure between the inlet valve 70 and the tire valve to stabilize to improve the accuracy of the pressure reading that may be obtained with the second pressure sensor 78. Next, the tire inflation pressure may be measured or detected with a sensor, such as the second pressure sensor 78. As such, the tire inflation pressure may be measured with a pressure sensor that is disposed outside of the tire 32 and may be measured before opening the exhaust valve 74 or while the exhaust valve 74 is closed.

The measured or detected tire pressure may be compared to the target tire pressure. The target tire pressure may be indicative of a desired tire pressure and may account for design tolerances of a tire valve, such as the tolerance range associated with opening the tire valve. The target tire pressure may be a predetermined value or predetermined pressure range that may be based on the make and model of the tire and/or vehicle development testing. If the measured tire pressure is less than the target tire pressure (i.e., less than the target tire pressure or less than the smallest value of a target tire pressure range), then the tire may be underinflated and the tire may then be inflated by providing pressurized gas from the pressurized gas source 42 to the tire 32 by opening the inlet valve 70 and the outlet valve 72 associated with the tire 32. Pressurized gas may be provided for a predetermined period of time that may be associated with an amount of additional tire pressure desired and/or until the tire is inflated to the target tire pressure. If the measured tire pressure is greater than the target tire pressure (i.e., greater than the target tire pressure or greater than the largest value of a target tire pressure range), then the tire may be overinflated and the tire may then be deflated by exhausting pressurized gas from the tire 32 via the exhaust valve 74. If the measured tire pressure is not less than or greater than the target tire pressure or outside the target tire pressure range, then the tire pressure may be satisfactory and the tire may not be inflated or deflated. Block 106 may be repeated to potentially adjust the inflation of additional tires when a common target tire inflation pressure is utilized. Additional method steps may be repeated, such as blocks 104 and 106 to determine target tire pressures and/or adjust tire pressure if necessary for individual tires or axle assemblies when different target tire inflation pressures may be utilized.

Adjusting tire inflation pressure based on vehicle load or changes in vehicle load may help improve vehicle handling, tire life, and/or fuel economy by helping avoid overinflated or underinflated tires. In addition, the system and method described herein may allow tire pressure to be changed in response to vehicle load or weight changes, such as coupling or decoupling of a trailer, loading or unloading of a trailer, cargo weight distribution changes, increase or decrease in fuel load, and/or increase or decrease in the number of vehicle passengers. Such monitoring and control may occur while the vehicle is in motion or operation to provide real-time tire pressure management.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling tire inflation pressure for a vehicle comprising:
   determining a vehicle load and a vehicle driving mode;
   determining a target tire pressure based on the vehicle load and the vehicle driving mode; and
   adjusting inflation pressure of a tire based on the target tire pressure.

2. The method of claim 1 wherein the vehicle load is based on data indicative of pressure in an air spring that is provided with an axle suspension system of the vehicle.

3. The method of claim 1 wherein the vehicle load is based on vehicle ride height data that is measured with a vehicle ride height sensor.

4. The method of claim 1 wherein the vehicle load is provided manually by a vehicle operator.

5. The method of claim 1 wherein the vehicle has a set of tires and wherein the target tire pressure is the same for each member of the set of tires.

6. The method of claim 1 wherein the vehicle has a set of axle assemblies and each member of the set of axle assemblies has a first tire and a second tire, wherein the target tire pressure is independently determined for each member of the set of axle assemblies such that the target tire pressure is the same for the first tire and the second tire of a selected member of the set of axle assemblies.

7. The method of claim 6 wherein each member of the set of axle assemblies has a different target tire pressure.

8. The method of claim 1 wherein the vehicle has a set of axle assemblies and each member of the set of axle assemblies has a first tire disposed on a left side of the vehicle and a second tire disposed on a right side of the vehicle, wherein a target tire pressure is determined for the first tire of each member of the set of axle assemblies and for the second tire of each member of the set of axle assemblies.

9. The method of claim 1 wherein the vehicle has an axle assembly that has a first tire and a second tire, wherein the vehicle load is determined proximate the first tire and proximate the second tire and the target tire pressure is established independently for the first tire and the second tire.

10. The method of claim 1 wherein the vehicle load further is determined when a vehicle load sampling interval has elapsed, wherein the vehicle load sampling interval has elapsed when a predetermined period of time has elapsed and when the vehicle has travelled a predetermined distance.

11. The method of claim 1 wherein the vehicle driving mode is manually provided by a vehicle operator.

12. The method of claim 1 wherein the vehicle driving mode is automatically detected based on a signal from a wheel speed sensor.

13. The method of claim 1 wherein the target tire pressure for an on-road vehicle driving mode is greater than the target tire pressure for an off-road vehicle driving mode.

14. The method of claim 1 wherein the vehicle has a set of axle assemblies and each member of the set of axle assemblies has a first tire and a second tire, wherein the target tire pressure is independently determined for each member of the set of axle assemblies such that the target tire pressure is the same for the first tire and the second tire of a selected member of the set of axle assemblies.

15. The method of claim 1 wherein the vehicle has a set of axle assemblies that each have a first tire and a second tire, wherein the target tire pressure is independently determined for the first tire and the second tire of each member of the set of axle assemblies.

16. A tire inflation system for a vehicle comprising:
   a pressurized gas source that supplies a pressurized gas and that is configured to be fluidly connected to a tire;
   a pressure sensor that measures an inflation pressure of the tire; and
   a controller that determines a target tire pressure based on data indicative of a vehicle load and a vehicle driving mode and that controls the inflation pressure of the tire;
   wherein pressurized gas is provided to the tire when the target tire pressure is less than the inflation pressure of the tire.

17. The system of claim 16 wherein pressurized gas is vented from the tire when the target tire pressure is less than the inflation pressure of the tire.

18. The system of claim 16 wherein the data indicative of the vehicle load is provided by a load sensor that is provided with an axle suspension system.

19. The system of claim 16 wherein the vehicle driving mode is based on vehicle ride height data that is measured with a vehicle ride height sensor.

20. The system of claim 16 wherein the vehicle has a set of tires and the target tire pressure is determined independently for each member of the set of tires.

* * * * *